United States Patent [19]
Palaniappan et al.

[11] Patent Number: 6,079,185
[45] Date of Patent: Jun. 27, 2000

[54] INDUCTION HEAT SEALING OF A CLOSURE TO A CONTAINER

[75] Inventors: Sevugan Palaniappan, Sugar Land, Tex.; Kenneth Pokusa, Willowbrook, Ill.; Pär Andersson, Bjärred, Sweden

[73] Assignee: Tetra Laval Holdings & Finance, SA, Pully, Switzerland

[21] Appl. No.: 09/127,270

[22] Filed: Jul. 31, 1998

[51] Int. Cl.[7] ...................................................... B65B 61/18
[52] U.S. Cl. ............................. 53/412; 53/410; 53/133.2; 53/133.4; 493/87; 493/212; 493/213
[58] Field of Search ................................. 156/69; 493/87, 493/212, 213; 53/133.2, 133.4, 410, 412

[56] References Cited

U.S. PATENT DOCUMENTS

| | | |
|---|---|---|
| 3,604,880 | 9/1971 | O'Neill . |
| 4,237,360 | 12/1980 | Pohlenz . |
| 4,380,484 | 4/1983 | Repik et al. . |
| 4,530,442 | 7/1985 | Vogel, Jr. et al. . |
| 4,549,051 | 10/1985 | Ness . |
| 4,573,582 | 3/1986 | Kusz . |
| 4,704,509 | 11/1987 | Hilmersson et al. . |
| 4,707,213 | 11/1987 | Mohr et al. . |
| 4,719,740 | 1/1988 | Gach . |
| 4,754,113 | 6/1988 | Mohr et al. . |
| 4,781,304 | 11/1988 | Lapeyre . |
| 4,836,691 | 6/1989 | Suzuki et al. . |
| 4,909,434 | 3/1990 | Jones et al. . |
| 4,941,306 | 7/1990 | Pfaffmann et al. . |
| 4,964,562 | 10/1990 | Gordon . |
| 5,001,319 | 3/1991 | Holmström . |
| 5,013,878 | 5/1991 | Fries, Jr. . |
| 5,109,653 | 5/1992 | Kubis et al. . |
| 5,117,613 | 6/1992 | Pfaffmann . |
| 5,191,181 | 3/1993 | Regenscheid . |
| 5,200,587 | 4/1993 | Fang . |
| 5,267,934 | 12/1993 | Pape et al. . |
| 5,366,433 | 11/1994 | McCormick . |
| 5,484,374 | 1/1996 | Bachner et al. . |
| 5,601,669 | 2/1997 | Moody et al. . |
| 5,636,784 | 6/1997 | Huser . |
| 5,649,407 | 7/1997 | Blomqvist . |
| 5,712,042 | 1/1998 | Cain . |
| 5,720,401 | 2/1998 | Moore . |

FOREIGN PATENT DOCUMENTS 0838325  4/1998  European Pat. Off. .

*Primary Examiner*—Daniel B. Moon
*Attorney, Agent, or Firm*—Welsh & Katz, Ltd.

[57] ABSTRACT

An induction sealing device is utilized to seal a closure to a container on a packaging machine. The induction sealing device has a recess area for receiving a spout of a closure during the application process. A current is induced in a metal medium that generates heat to melt and chemically bond a closure to a container. The metal medium may be found in either the closure or the container.

14 Claims, 10 Drawing Sheets

INDUCTION HEAT SEALING OF A CLOSURE TO A CONTAINER

BACKGROUND OF THE INVENTION

1. Field of the Invention

The present invention relates to closures/fitments for application to a container. Specifically, the present invention relates to a closure for application to a gable top carton through use of induction heating.

2. Description of the Related Art

The traditional gable top carton has been augmented with the inclusion of a closure to access the carton's product, usually orange juice or milk. The closure is generally composed of a flange, spout and cap. The closure not only provides for enhanced resealability after accessing the product, but also creates a perception in the consumer's mind of a higher quality product.

In the majority of operations, the closure is attached to a carton on a packaging machine prior to filling. The attachment usually occurs through use of an ultrasonic horn device. One such applicator, a rotary type, is disclosed in U.S. Pat. No. 5,484,374. Another ultrasonic applicator, a linear type, is disclosed in U.S. Pat. No. 5,601,669. Ultrasonic applicators usually apply a closure to a carton by positioning an anvil, with a closure attached, into the open end of the carton. The anvil is then translationally moved towards an ultrasonic horn wherein the closure is placed through an incision in the carton. The ultrasonic horn and the anvil engage the closure and carton wall. The ultrasonic horn is then actuated to deliver a burst of ultrasonic energy to the closure and carton thereby sealing the closure to the carton. Although ultrasonic applicators adequately seal closures to a container, there are some negatives associated with the use of ultrasonic applicators on packaging machines. The greatest negative is the noise generated by the ultrasonic applicator during sealing operations. Another major negative is properly aligning the anvil and the sonotrode to obtain uniform pressure distribution. Another negative is the dust or excess material dispersed during the sealing operation. Yet another negative is the power necessary to generate the ultrasonic energy, and providing an anvil capable of withstanding the force of the ultrasonic energy. All of these negatives deter from the use of ultrasonic applicators on packaging machines that produce aseptic cartons.

Other methods of applying closures utilize hot melt to attach the flange of the closure to the material. Still others apply the closure to the carton after filling and sealing. One such post-processing application of closures to containers is described in European Patent Application 0838325 ("EPO '325"). EPO '325 discloses a fitment having a flange with a polyethylene band which has a current inductive wire confined within the band and having terminals protruding therefrom. During post-processing attachment, the closure is positioned on a container, and a current is fed through the wires to melt the polyethylene to bond the flange to a container. EPO '325 mentions that the wire could take the form of a strip or an electrically conductive layer within the band of the flange. EPO '325 only discloses integrating the "electrical heating element" into the flange such that a polyethylene/plastic layer covers the electrical heat element for heating thereby. It is obvious that EPO '325 utilizes the resistivity of the wire to generate heat when a current is applied to terminals on the closure. It is also necessary that the closure of EPO '325 have a "cutting" device to rupture the container since the closure is applied post-processing of the container.

Induction heat sealing has been used to seal a top-like closure to a cup-like container. One example is disclosed in U.S. Pat. No. 4,237,360 wherein a top and container are passed through a magnetic field to heat metal foils in the top and container in order to melt a resin for application of the top to the container. However, the induction heat sealing method of U.S. Patent 4,237,360 would not be applicable to sealing a closure with a flange, spout and cap to a container such as a gable top carton. Other problems have prevented the use of induction heat sealing of closures to containers. Thus, a need still exists for applying a closure to a container on a packaging machine prior to filling which does not involve ultrasonic sealing or hot melt.

BRIEF SUMMARY OF THE INVENTION

The present invention provides a solution to the need for applying closures to a container on a packaging machine without the use of ultrasonic applicators and hot melt. The present invention is able to accomplish this by providing a method and apparatus that utilizes induction heating to seal a closure to a container on a packaging machine. The present invention requires that a metal medium be provided, either on the closure, the container or as a membrane to be attached during application of the closure to the container. An induction sealing device induces a current in the metal medium to heat a thermoplastic coating of the closure and container for bonding of the container to the closure.

One aspect of the present invention is a method for applying a closure to a container on a form, fill and seal packaging machine. The method includes processing a packaging material for fabrication into a container on the packaging machine with the packaging material having an access area. The method also includes transporting a plurality of closures to an applicator station and placing a closure about the access area of the packaging material at the applicator station. The applicator station has an induction sealing device that has a body with a recess for receiving a cap and a spout of the closure. The body has an incomplete annular current area for creating a magnetic field. The method also includes sealing the closure to the packaging material about the access area by inducing a current in a metal medium from the magnetic field created by an electrical current flowing through the incomplete annular current area of the induction sealing device.

Another aspect of the present invention is a packaging machine. The packaging machine includes a conveyor, a supply of closures, a retrieving means, an induction sealing device and a source of electricity. The conveyor transports each of the series of containers along the packaging machine. The retrieving means retrieves a closure from the supply of closures and places the closure about the access area of a container for sealing thereto. The retrieving means has longitudinal and translational drive mechanisms. The induction sealing device is disposed on one side of the conveyor. The induction sealing device has a body with a recess for receiving the cap and spout of the closure. The body has an incomplete annular current area for creating a magnetic field. The induction sealing device also has a mechanism for translational movement.

It is a primary object of the present invention to provide a method and apparatus for induction heat sealing a closure to a container.

It is an additional object of this invention to provide a method and apparatus for induction heat sealing a closure to a container on an aseptic packaging machine.

It is an additional object of the present invention to provide a method and apparatus for induction heat sealing a closure to a gable top carton on an aseptic packaging machine prior to filling with a product.

Having briefly described this invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
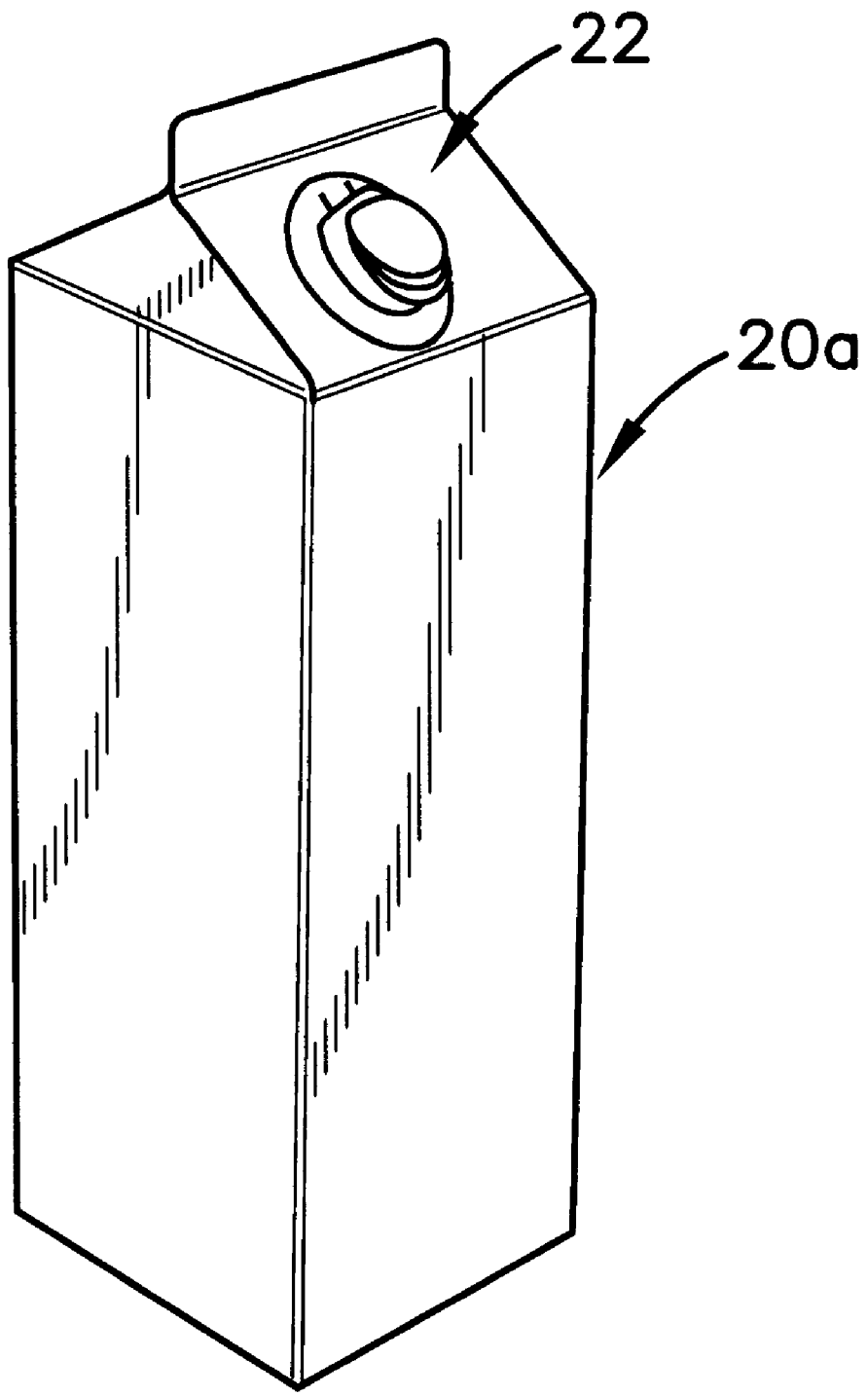
FIG. 1 is a perspective view of a gable top carton with a closure attached thereon.
Figure 2:
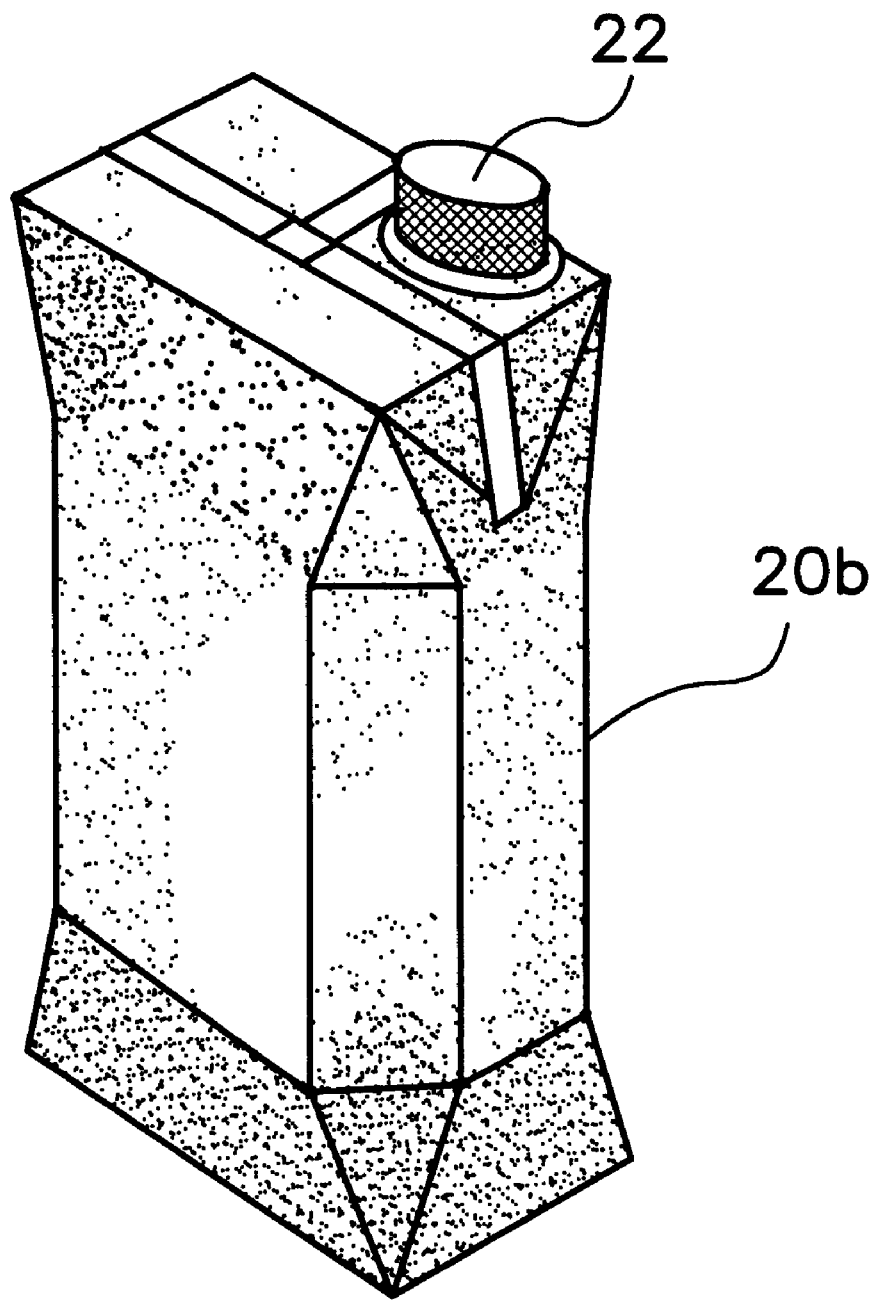
FIG. 2 is a perspective view of a TETRA BRIK® package with a closure thereon.

FIGS. 1 and 2 illustrate two containers 20 that may benefit from the present invention. The gable top carton 20a of FIG. 1 and the TETRA BRIK® package 20b of FIG. 2 each have a closure 22 attached thereto, and both containers 20a–b may be composed of a material including a metal layer such as an aluminum layer. The closure 22 is applied to the containers 20a–b through utilization of the present invention for induction heat sealing of the closure 22 to the containers 20a–b.

Figure 4:
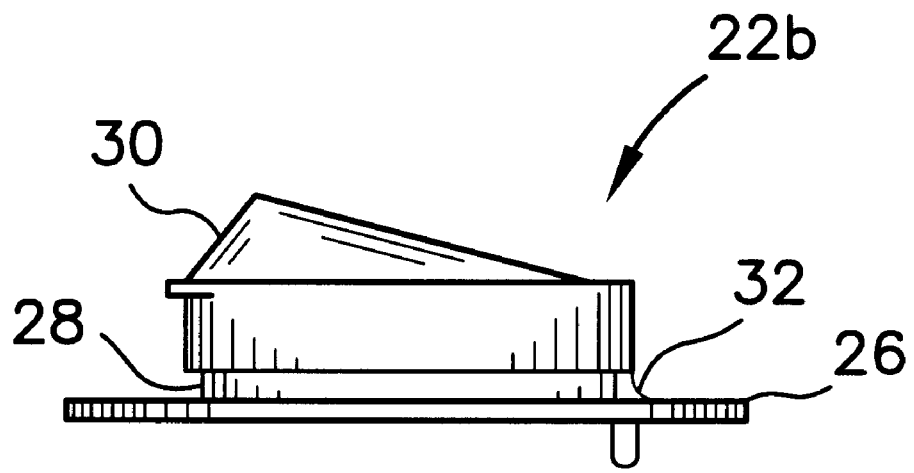
FIG. 4 is a perspective view of a flip-cap closure of the present invention.
Figure 3:
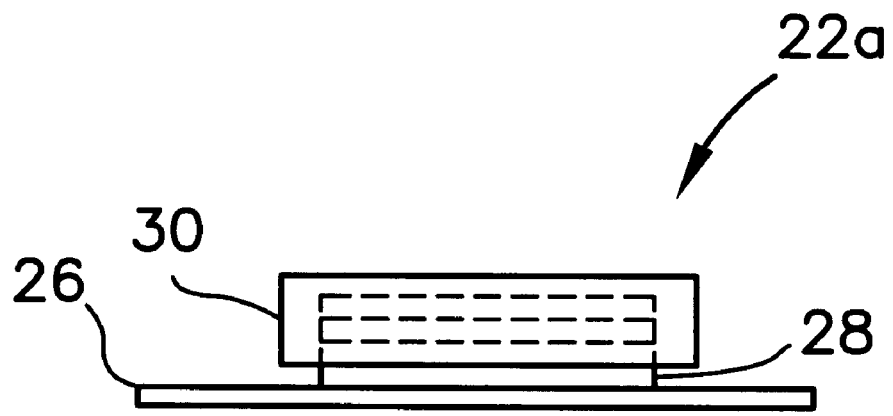
FIG. 3 is a perspective view of a screw cap closure of the present invention.

FIGS. 3 and 4 illustrate a screw-cap closure 22a and a flip-cap closure 22b. Both closures 22a and 22b have a flange 26, a spout 28 and a cap 30. The flip-cap closure 22b has the cap 30 attached to the flange 26 by a hinge 32 while the screw-cap closure 22a is removable by a threading mechanism. The closures 22 are usually composed of a polyethylene material that easily seals to the polyethylene coating of a container 20.

Figure 5:
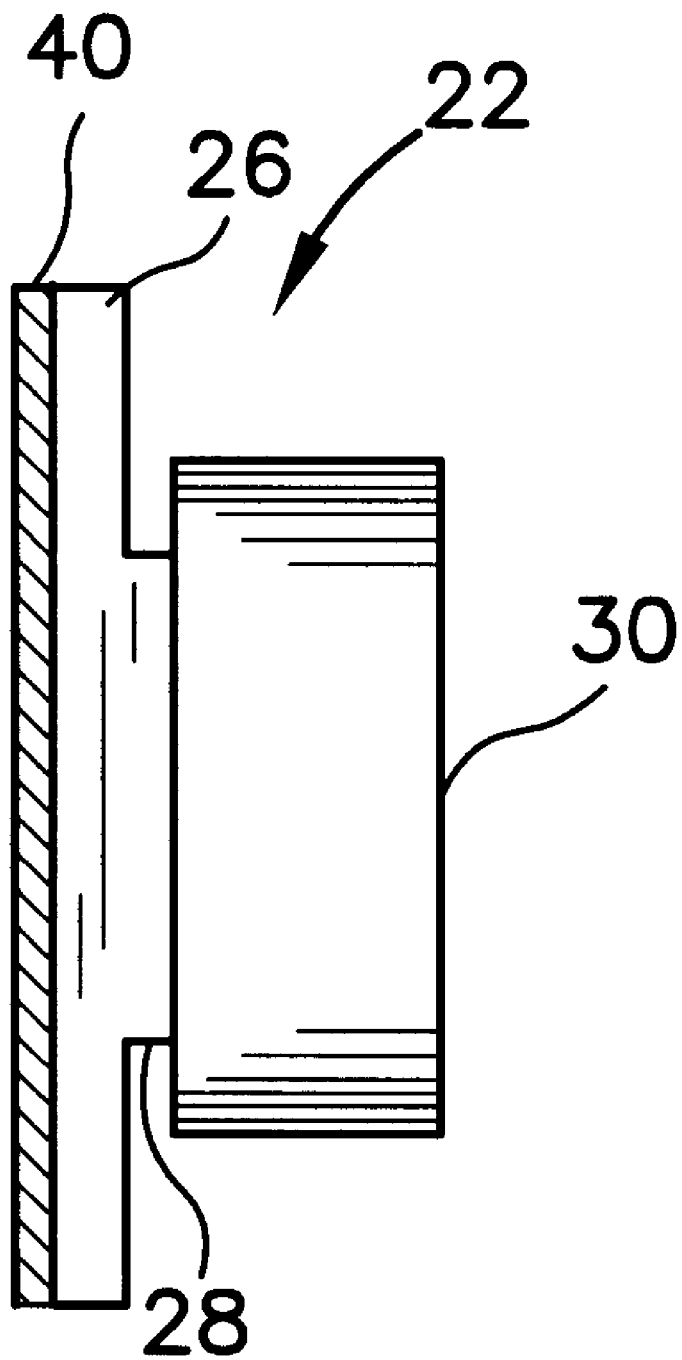
FIG. 5 is a side view of a closure with a metal membrane attached thereto.

As shown in FIG. 5, a closure 22 may have a metal membrane 40 attached to the interior surface of the flange 26. The metal membrane 40 may be composed of aluminum, and may be an aluminum foil or powder substance. The metal membrane 40 may be a single layer membrane 40 or the membrane 40 may have several layers wherein a metal layer is enclosed on both sides by thermoplastic layers. The thermoplastic layers may protect the metal layer from damage, and may act as adhesion agents for attaching the closure 22 to a container 20. The thermoplastic layers may be composed of polyethylene, polyethylene terephthalate ("PET"), or other appropriate thermoplastics.

The metal membrane 40 may be annular with an aperture in the center, to only mate with the flange 26 of the closure 22. Thus, the metal membrane 40 will not cover an access area of the closure 22. Alternatively, the membrane 40 may cover the entire interior surface of the closure 22, and act as a barrier membrane if the closure 22 is not provided with its own integrated barrier membrane. The membrane 40 may be attached to the closure 22 subsequent to the manufacture of the closure, or at a converting facility. The closure 22 with the metal membrane 40 attached is then supplied to the operator of a packaging machine to be attached to containers 20 fabricated at the operator's facility.

Figure 6:
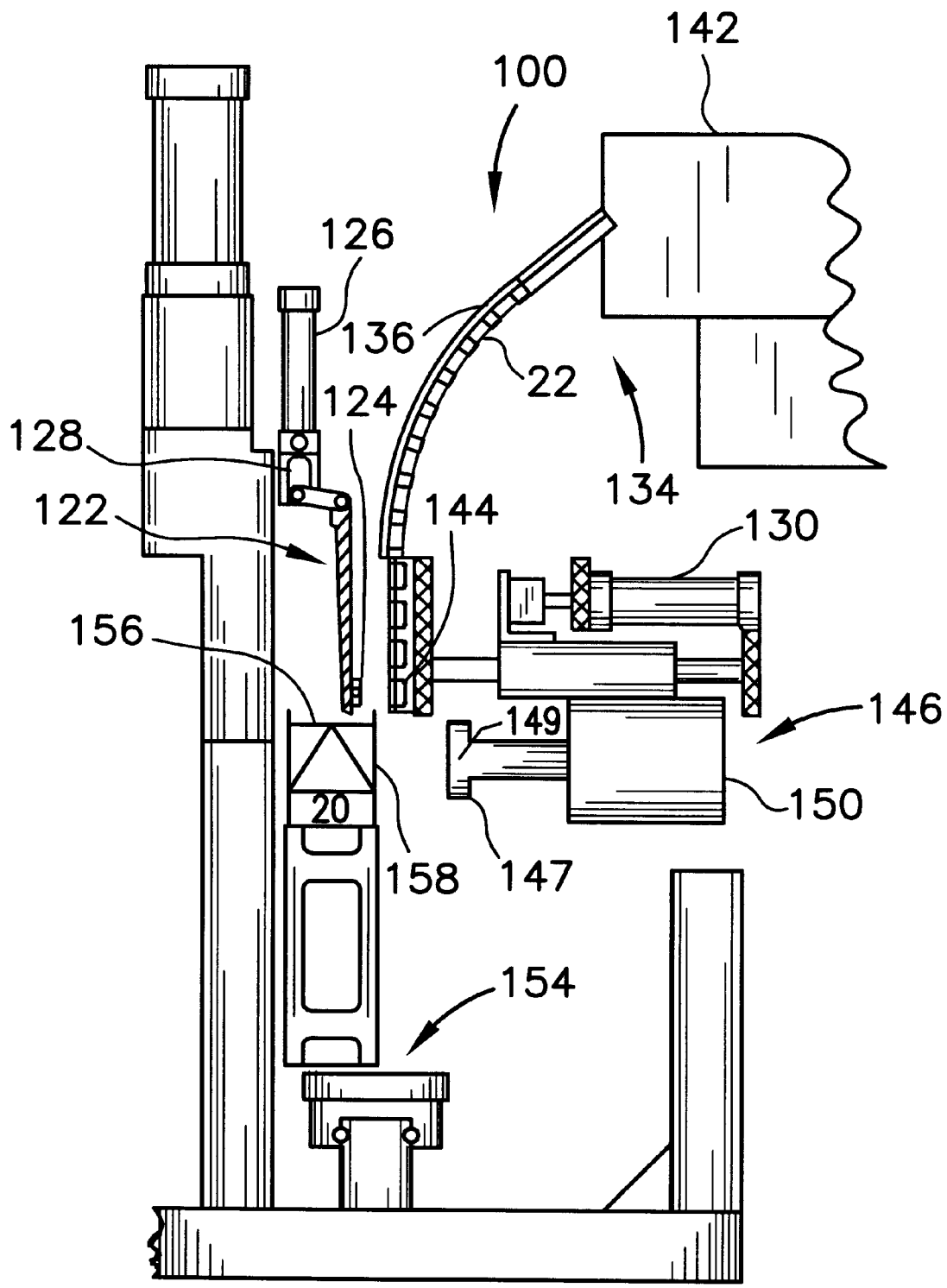
FIG. 6 is an isolated view of an applicator of the present invention in the process of induction heat sealing a closure to a partially-formed gable top carton with an open top.

Referring to FIG. 6, the applicator of the present invention is generally designated 100. In this embodiment, the applicator 100 has an arm 122 that is capable of translational movement and longitudinal oscillation. The arm 122 has a closure engagement means 124 protruding from one surface of the arm 122. The arm 122 is attached from above to a first drive source 126 by a first lever 128. The first drive source 126 provides for the longitudinal movement of the arm 122 from a first horizontal plane to a second horizontal plane. Translational movement of the arm 122 is accomplished by a second drive source 130 which is attached to the arm 122 by a second lever 132, not shown. The arm 122 may be moved along a horizontal plane from a forward position to a longitudinal pathway position.

Still referring to FIG. 6, a closure dispenser is generally designated 134. The closure dispenser 134 is composed of a chute 136 which transports closures 22 from a closures feeder 142 to an engagement point 144 at one end of the chute 136, and also located on the first horizontal plane. A closure 22 placed in the engagement point 144 is positioned to be engaged by the closure engagement means 124. A more thorough explanation of a closure dispenser is provided in U.S. Pat. No. 5,992,129 entitled Orienting Apparatus For An Orientationally Sensitive Closure which is hereby incorporated by reference in its entirety.

An induction sealing device is generally designated 146. The induction sealing device 146 consists of a body 147 having a recess area 149 therein. The induction sealing device 146 is connected to a transformer 150 that is connected to a supply of electricity. The induction sealing device 146 is capable of linear movement toward and away from the container 20. The container 20 is conveyed to a position below the applicator 20 by a conveyor 154. The container 20 is partially constructed and has an open end 156 for placement of the arm 122 therethrough. The container 20 has an incision 158 that has been cut into the container 20 for placement of a closure 22 therethrough. The closure 22 has a flanged end that is positioned against the interior walls of the container 20 while the spout protrudes through the incision 156. The induction sealing device 146 is horizontally aligned with the incision 158 of the container 20 for temporary engagement of the induction sealing device 146 with the closure 22 when it is inserted through the incision 158 of the container 20. A more thorough description of the motions of the arm and the induction sealing device is provided in U.S. Pat. No. 5,819,504, entitled Process And Apparatus For Applying Fitments To A Carton which is hereby incorporated by reference in its entirety.

Figure 7B:
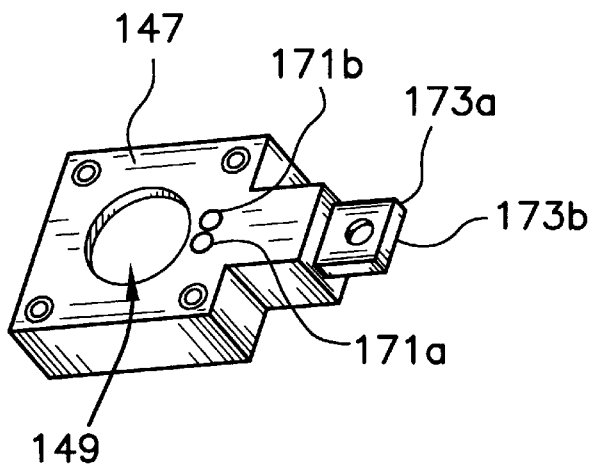
FIG. 7B is a rear view of the induction heat sealing device of FIG. 7.
Figure 7:
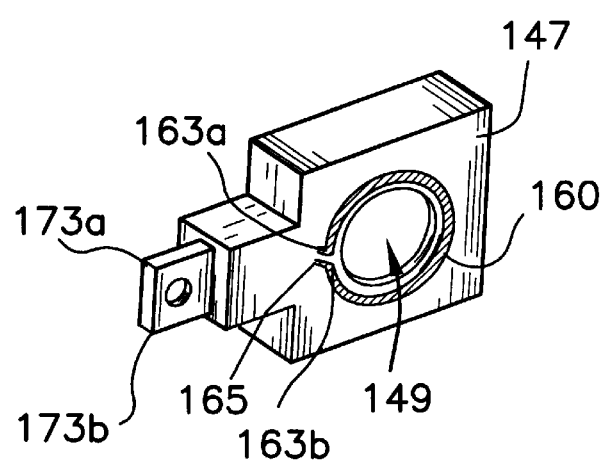
FIG. 7 is an isolated perspective view of a portion of the induction heat sealing device of the present invention.
Figure 7A:
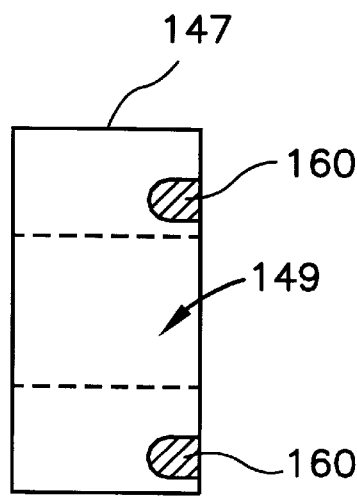
FIG. 7A is a cross-sectional view of the induction heat sealing device of FIG. 7.

As shown in FIGS. 7, 7A and 7B, the induction sealing device 146 has a circular recess area 149. However, those skilled in the pertinent art will recognize that the recess area 149 may have various shapes in order to accept the spout of a closure 22. A current area 160 substantially encircles the recess area 149. The current area 160 is composed of an electrically conductive material such as copper, steel, gold and aluminum. The current area 160 does not completely encircle the recess area 149, ending, on the surface at least at the surface termini 163a–b. An electrical current flows from surface terminus 163a, through current area 160 and out through surface terminus 163b. The current area 160 continues within the body 147 to electrical connectors 173a–b. Thus, an electrical current is brought from electrical connector 173a through surface terminus 163a, through the current area 160, through surface terminus 163b and to a ground or the like from electrical connector 173b. An interrupt area 165 prevents a complete encirclement of the recess area 149. A complete encirclement of the recess area 149 is not possible since the current must have an inlet and an outlet. The interrupt area 165 would suggest to one skilled in the art that a proper seal between the closure and the container would not be achieved with induction sealing since the corresponding area on the closure or container would not have an induced current to heat the thermoplastic for sealing. However, unexpected from theory, the seal between the closure and the container is complete.

The interrupt area 165, like the entirety of the body 147 except for the current area 160, may be composed of an insulator material or a material having a much lower conductivity than the material of the current area 160. Graphite may be used as an insulating material for the body 147. As the current flows through the current area 160, a magnetic field is established that induces a current in the metal medium, either in the container 20 or the closure 22. As the current flows through the metal medium, the resistivity of the metal medium generates heat which partially melts the thermoplastic coatings on the closure 22 and/or the container 20 resulting in the chemical bonding of the thermoplastics of the closure 22 to the thermoplastics of the container 20. The body 147 is cooled by water flowing through ports 171a–b.

Figure 8:
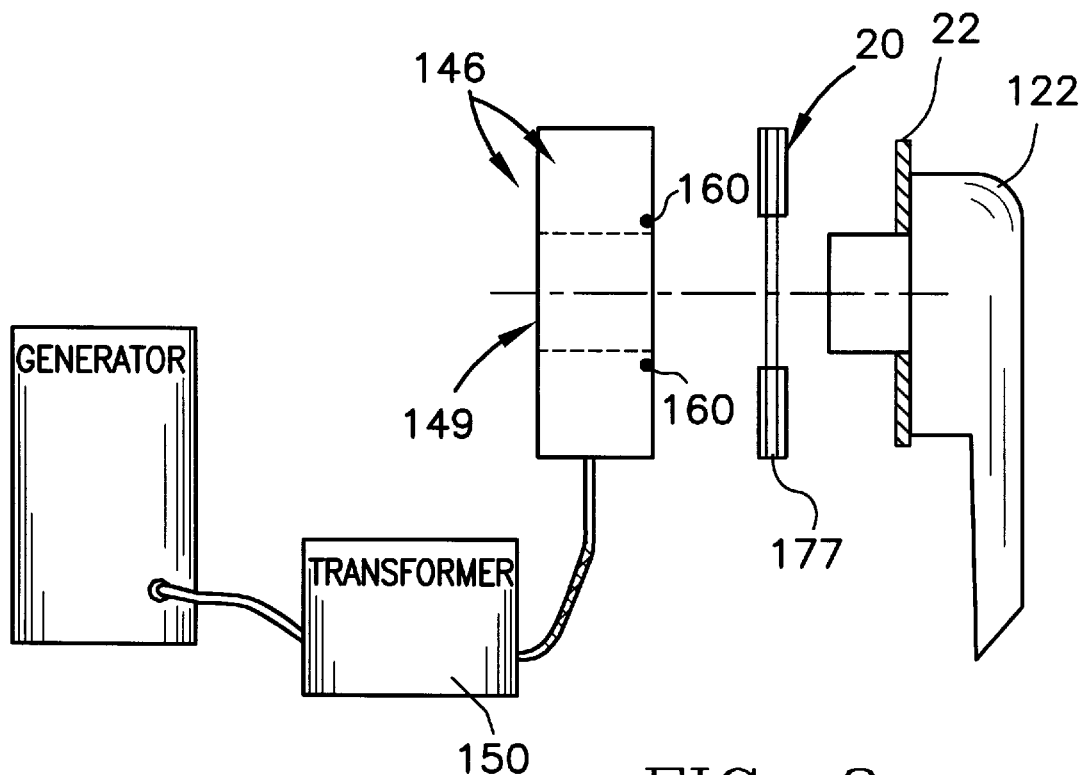
FIG. 8 is a schematic view of the applicator of the present invention in relation to a container wall and an arm with a closure thereon.
Figure 9:
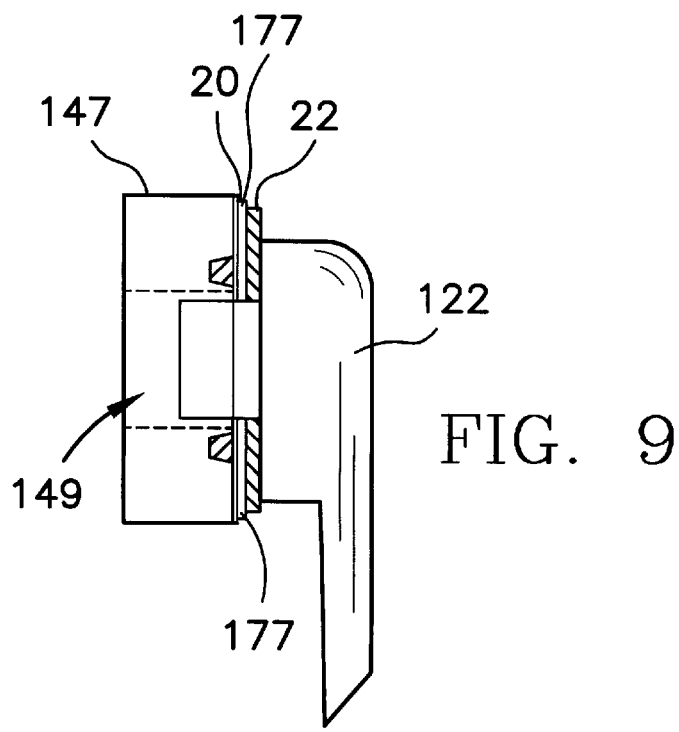
FIG. 9 is a schematic view of the applicator of the present invention during sealing of a closure to a container.

FIGS. 8 and 9 illustrate an isolated view of the induction sealing device 146 engaging the closure 22, the container 20 and the arm 122. FIG. 8 shows the transformer 150 that is in electrical flow communication with the induction sealing device 146 and a generator or electrical power supply 170. FIG. 9 shows the application process wherein a magnetic field created by the electrical current flowing through the current area 160 induces a current in the metal medium 177 (in this example the metal medium is an aluminum layer of the container 20) which generates sufficient heat to heat seal the closure 22 to the container 20. The arm 122 basically operates as a positioning tool for the closure 22. However, unlike ultrasonic applicators, precise alignment between the arm 122 and the induction sealing device 146 is not necessary. Thus, the arm 122 need only have a minimum structural support since the arm 122 is not subject to any substantial force during application, and alignment parameters are more easily achieved for induction heat sealing.

Figure 10:
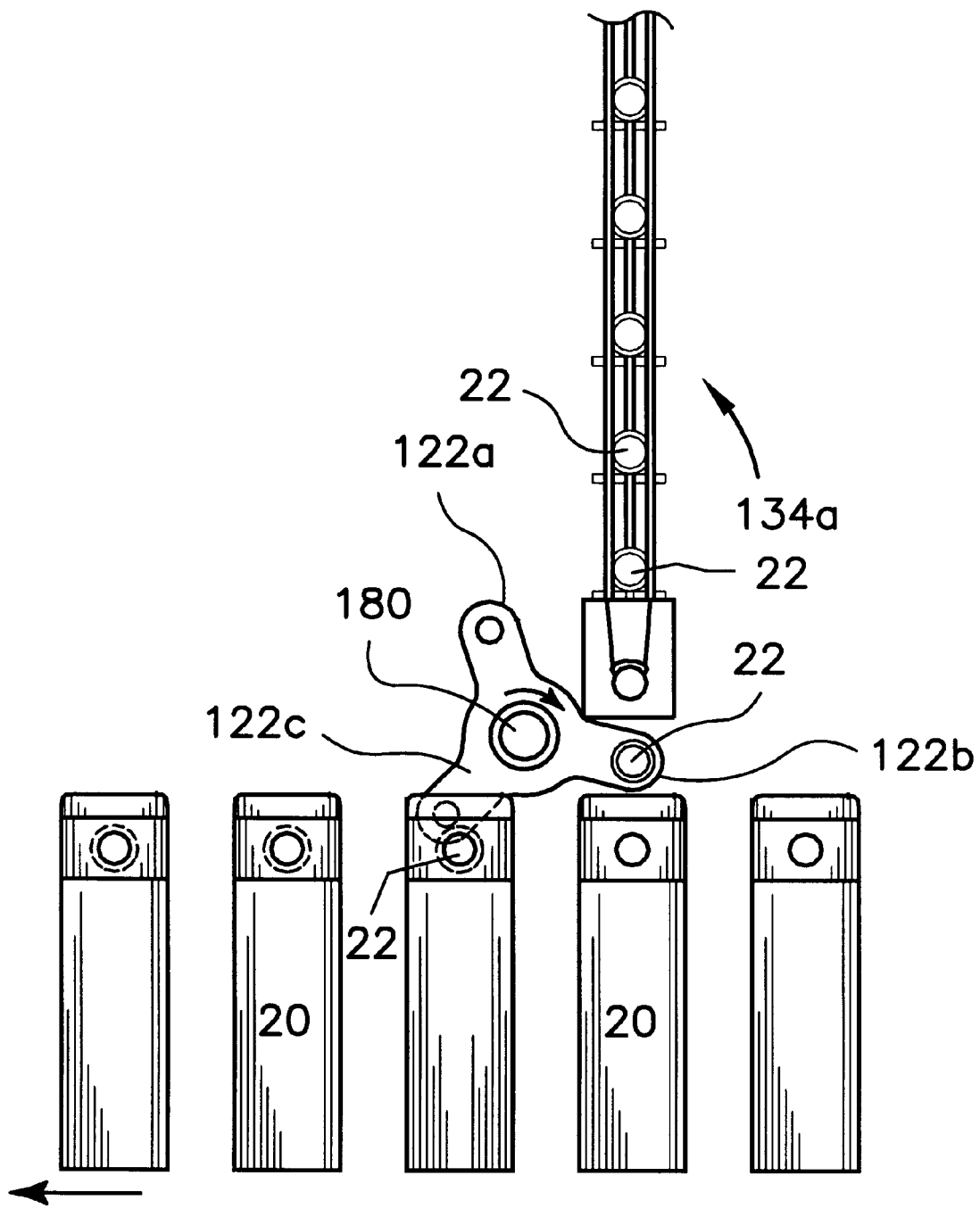
FIG. 10 is an isolated view of an alternative retrieval means for the present invention.

Another in-line application process is shown in FIG. 10. In this embodiment, the retrieval means has three arms 122a–c rotating around a turret 180. Each arm 122a–c retrieves a closure 22 from a closure dispenser 134a that is disposed on one side of the line of conveyance of containers 20. An induction sealing device 146, as described in FIGS. 8 and 9, would be in position to mate with the spout of the closure and seal the closure 22 to the container 20. Another method of retrieving closures 22 and inserting the closures into open-end containers is through use of offset rotating arms which allows for simultaneous processing of multiple containers on one line. In such a method, instead of three arms 122a–c, two arms 122 disposed approximately 180 degrees apart would rotate about a turret. Positioned next to these rotating arms would be a second set of rotating arms rotating about a second turret. After application of the closures to the containers, one turret-arm complex would move a greater distance rearward than the other for offset rotation. Such a closure application system is described in U.S. Pat. No. 5,983,599, entitled Offset Rotary Anvils For Applying Fitments To A Carton which is hereby incorporated in its entirety.

Figure 11:
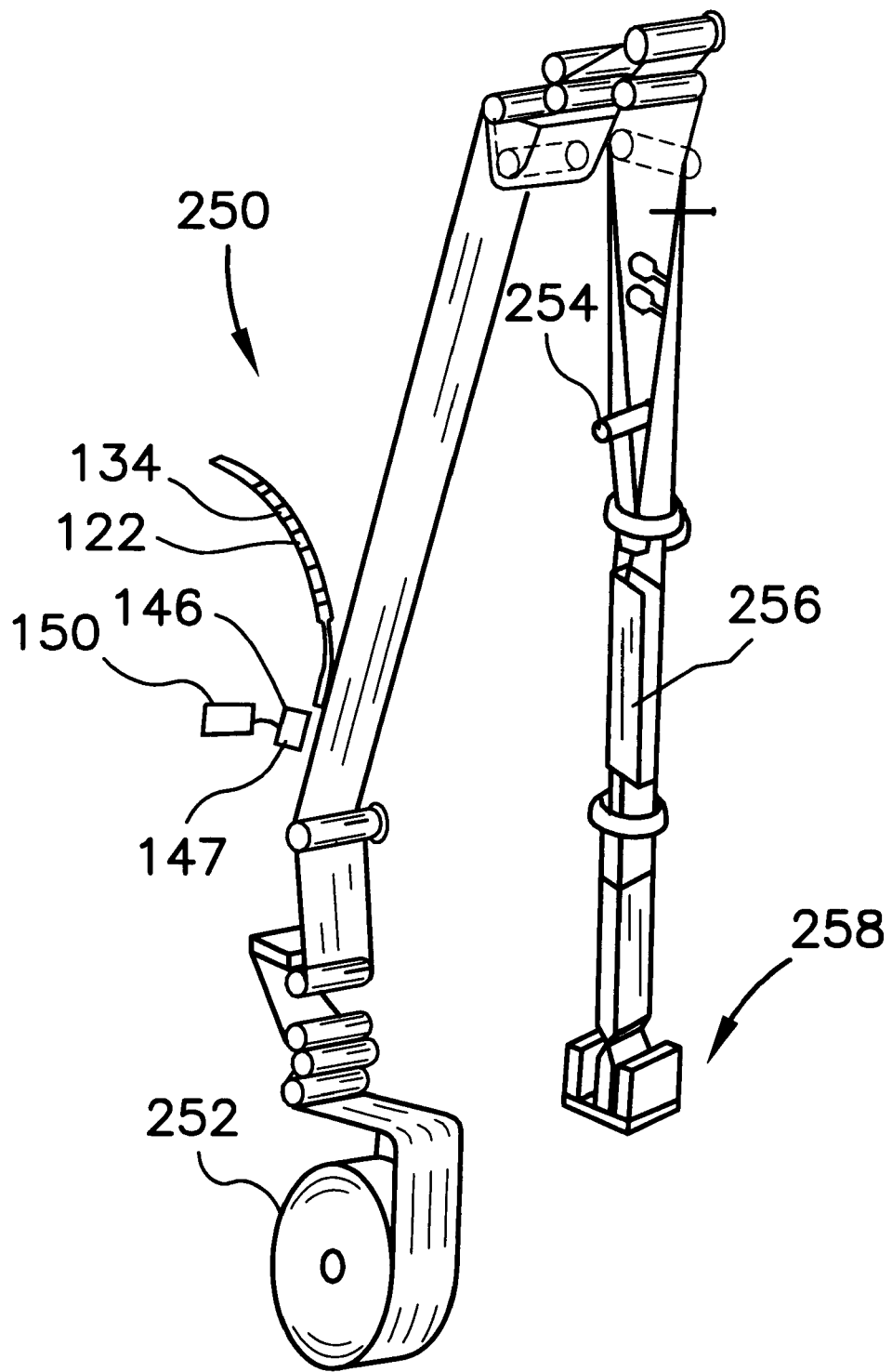
FIG. 11 is a schematic view of a web of material undergoing processing on a vertical form, fill and seal packaging machine with the applicator of the present invention integrated thereon.

Another application of the present invention is on a vertical form, fill and seal packaging machine such as a TETRA BRIK® packaging machine. The container 20b of FIG. 2 may be fabricated on a vertical form, fill and seal packaging machine 250 as shown in FIG. 11. The machine 250 receives a web of packaging material 252 that is driven through several rollers and folded into a tube about a fill pipe 254. The material tube is then sealed at a longitudinal sealer 256 that creates the longitudinal seal 222 on the container 20b. After the longitudinal sealer 256 is the transversal sealer 258. In operation, the transversal sealer 258 seals the top of one package while simultaneously sealing the bottom of the next package. When the bottom transversal seal is made, the package is filled with a product, then the top transversal seal is made to complete the package. The top transversal seal also cuts the package from the remaining tube of material. The package is then folded and shaped into the final container 20b.

Figure 11A:
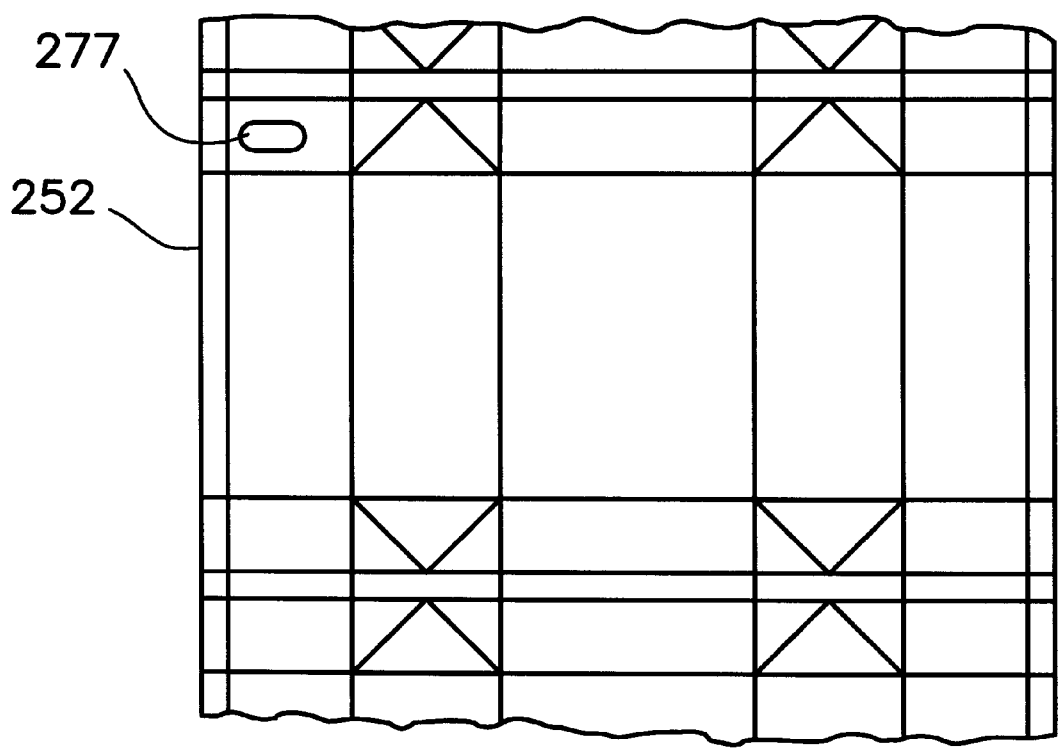
FIG. 11A is an isolated view of a portion of the web of packaging material of FIG. 11.

As shown in FIG. 11A, the closure 22 is to be applied to an access area 277. The closure may be applied to what will be the exterior surface of the container 20b. Alternatively, the access area 277 may be an aperture and the closure may be inserted therethrough wherein the exterior surface of the flange of the closure 22 mates with the interior surface of the container 20b.

Again, referring to FIG. 11, the application of closure occurs prior to forming a tube of the packaging material 252, and preferably prior to any sterilization of the packaging material 252. In most circumstances the packaging material 252 will have an aluminum layer allowing for induction heat sealing of the closure to the packaging material 252. However, if the packaging material does not have a metal medium, then as described above, the metal medium will present on the closure in the form of a membrane. Alternatively, an isolated metal membrane may be provided for mating between the closure 22 and container 20b just prior to induction heat sealing.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims:

What is claimed is:

1. A method for applying a closure to a container on a form, fill and seal packaging machine, the method comprising:

processing a packaging material for fabrication into a container on the packaging machine, the packaging material having an access area;

transporting a plurality of closures to an applicator station, each of the plurality of closures having a flange, a spout and a cap, the flange having an interior surface and an exterior surface, the spout protruding from the exterior surface of the flange;

placing a closure about the access area of the packaging material at the applicator station, the applicator station having an induction sealing device, the induction sealing device having a body with a recess for receiving the cap and spout of the closure, the body defining an incomplete annular current area for creating a magnetic field, the incomplete annular current area being outwardly spaced from the recess and having first and second terminal ends spaced from one another;

sealing the closure to the packaging material about the access area by inducing a current in a metal medium from the magnetic field created by an electrical current flowing through the incomplete annular current area of the induction sealing device, the metal medium provided in one of the closure and packaging material; and filling the packaging material with a product.

2. The method according to claim 1 wherein the packaging material is a carton blank and processing the packaging material comprises erecting and bottom forming the carton blank to provide a partially-formed carton with an open top placed on a conveyor for conveyance to the applicator station.

3. The method according to claim 2 further comprising top sealing a gable top of the carton subsequent to filling with a product.

4. The method according to claim 3 wherein the access area is a hole in a top panel of the carton, the hole having a diameter greater than a diameter of the spout, however, less than the diameter of the flange.

5. The method according to claim 4 wherein placing the closure about the access area comprises placing an arm with a closure engaged thereto into the open top of the carton, then moving the arm transversally to the movement of the conveyor to insert the closure through the hole in the carton for induction heat sealing to the carton.

6. The method according to claim 2 wherein the metal medium is a layer of the material of the carton blank.

7. The method according to claim 1 wherein the metal medium is a membrane attached to the closure.

8. The method according to claim 1 wherein the packaging material is a web of a laminated paperboard material having score lines defining individual packages.

9. The method according to claim 8 wherein the induction sealing device retrieves the closure from a closure supply and seals the interior surface of the flange to an exterior surface of the laminated paperboard.

10. A packaging machine for processing a series of containers, each container having an access area, the packaging machine comprising:

a conveyor for transporting each of the series of containers along the packaging machine;

a supply of closures, each of the closures having a flange, a spout and a cap, the flange having an interior surface and an exterior surface, the spout protruding from the exterior surface of the flange;

means for retrieving a closure from the supply of closures and placing the closure about the access area of a container for sealing thereto, the retrieving means having a longitudinal and translational drive mechanisms;

an induction sealing device disposed on one side of the conveyor, the induction sealing device having a body with a recess for receiving the cap and spout of the closure, the body further defining an incomplete annular current area outwardly spaced from the recess and having first and second terminal ends spaced from one another, the induction sealing device having a mechanism for translational movement; and a source of electricity in electrical communication with the induction sealing device.

11. The packaging machine according to claim 10 wherein the retrieving means comprises an arm with a lobe thereon for picking closures from the supply of closures on a first horizontal plane, the arm capable of translational movement along the first horizontal plane to move from the supply of closures to a vertical position, the arm capable of vertical movement from the first horizontal plane to a second horizontal plane, the access area of a carton lying on the second horizontal plane.

12. The packaging machine according to claim 10 wherein the retrieving means comprises a pair of rotating arms approximately 180 degrees apart and mounted on a turret for rotation, each arm having a lobe for engaging a closure from the closure supply, the turret capable of translational movement from a rotating position to an engagement position.

13. The packaging machine according to claim 10 wherein the retrieving means comprises three rotating arms approximately 120 degrees apart and mounted on a turret for rotation, each arm having a lobe for engaging a closure from the closure supply, the turret capable of translational movement from a rotating position to an engagement position.

14. An apparatus for applying closures to a series of containers being conveyed along a form, fill and seal packaging machine, the apparatus positioned at a single station of a multiple station form, fill and seal packaging machine, each of the containers having an open end and a pre-incised hole for receiving the closure therein, the closures each having a cap and a spout, the apparatus comprising:

a closure dispenser containing a plurality of closures for engagement with a closure engagement means, the closure dispenser lying on a first level, the first level defined by a horizontal plane parallel to the line of conveyance, the closure dispenser within the single station;

an induction sealing device for sealing the closure to the container, the induction sealing device lying on a second level, the second level defined by a second horizontal plane, the second horizontal plane aligned with the pre-incised hole, the induction sealing device within the single station, induction sealing device having a body with a recess for receiving the cap and spout of the closure, the body defining an incomplete annular current area outwardly spaced from the recess and having first and second terminal ends spaced from one another, the incomplete annular current area configured for creating a magnetic field;

an arm having the closure engagement means protruding therefrom, the arm capable of vertical movement between at least the first level and the second level along a line perpendicular to the conveyance of the series of containers, and also capable of translational movement at the first level to retrieve a closure from the closure dispenser and at the second level to place the closure through the pre-incised hole and seal the closure onto the container, the arm within the single station; and a drive source connected to the arm, the drive source providing vertical movement of the arm between the first level and the second level, providing translational movement of the arm between the closure dispenser and a vertical movement position, and translational movement of the arm between the induction sealing device and the vertical movement position, the drive source within the single station.

* * * * *